United States Patent [19]
Fukumitsu et al.

[11] Patent Number: 6,141,052
[45] Date of Patent: *Oct. 31, 2000

[54] PORTABLE PERSONAL COMPUTER AND ELECTRONIC CAMERA

[75] Inventors: Yoshio Fukumitsu, Kanagawa; Shunji Oshima, Miyagi, both of Japan

[73] Assignee: Sony Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/833,723

[22] Filed: Apr. 9, 1997

[30] Foreign Application Priority Data

Apr. 15, 1996 [JP] Japan ................. PO8-092376

[51] Int. Cl.⁷ ............. H04N 7/14; H04N 5/225

[52] U.S. Cl. ............ 348/373; 348/15; 348/376; 348/552; 358/906; 364/705.05; D16/202

[58] Field of Search ................. 348/373, 375, 348/376, 552, 13, 15; 345/326, 329, 330, 905; 361/600, 683; 364/705.01, 708.1, 705.05; 379/202; D16/202, 106, 314; 358/906, 909.1

[56] References Cited

U.S. PATENT DOCUMENTS

| D. 363,471 | 10/1995 | Shima et al. ................. D14/106 |
| 5,708,853 | 1/1998 | Sanemitsu ..................... 395/893 |
| 5,734,414 | 3/1998 | Nishimura et al. ............... 348/14 |
| 5,768,163 | 6/1998 | Smith et al. ................ 364/705.01 |
| 5,801,919 | 9/1998 | Griencewic ..................... 361/683 |
| 5,825,408 | 10/1998 | Yuyama et al. .................. 348/14 |
| 5,867,218 | 2/1999 | Matsuzaki et al. ............... 348/373 |

FOREIGN PATENT DOCUMENTS

| 6-70314 | 3/1994 | Japan ................... H04N 7/14 |
| 6070314 | 3/1994 | Japan ................... H04N 7/14 |

*Primary Examiner*—Wendy Garber
*Assistant Examiner*—Ngoc-Yen Vu
*Attorney, Agent, or Firm*—Jay H. Maioli

[57] ABSTRACT

A portable personal computer having a display unit for displaying graphics, characters, etc. on a screen and an operation unit for inputting information, includes an upper panel having the display unit, a lower panel having the operation unit, an electronic camera which is at least partially designed in a spherical shape, and a mount recess portion having a curved-face support portion which is secured to a part of the upper panel and brought into contact with the spherical surface of the electronic camera to rotatably hold the electronic camera.

6 Claims, 10 Drawing Sheets

PORTABLE PERSONAL COMPUTER AND ELECTRONIC CAMERA

BACKGROUND OF THE INVENTION

The present invention relates to a portable personal computer and an electronic camera, and more particularly to an improvement of a mount structure for mounting an electronic camera such as a CCD camera in a personal computer.

A CCD camera which is connectable to a desktop type personal computer through a cable as shown in FIG. 1 has been known as an image pickup device for taking an image into a personal computer. As shown in FIG. 1, the desktop type personal computer comprises a main body 2, a display 3 for displaying graphics, characters, etc. on a screen, and a keyboard 4 which is connected to the main body 2 and performs an input operation.

An expansion slot which is to be connected to an external equipment (not shown) is provided in the main body 2, and a board having an interface circuit for inputting/outputting signals from/to the CCD camera 5 is inserted in the expansion slot to control image pickup and input image data of a pick-up image.

Further, as shown in FIG. 1, the CCD camera 5 has a tabletop structure, and it can pickup an image to which a lens barrel 6 thereof is directed. When the CCD camera 5 is mounted on the display 3, it picks up the image of the upper half body of a user of a personal computer 1. By using such a CCD camera 5, the user can see an image of another user of another personal computer which is connected through a computer network. As omitted in FIG. 1, if a microphone is connected to the personal computer 1 to transmit voice through the computer network, an user can have a conversation with another user while sitting before his or her computer.

The recent enhancement of CPUs enables portable personal computers to process image data, and thus it has been required that the portable personal computers take in image data.

However, with respect to an image pickup device which is connectable to a conventional personal computer, an image pickup range (imaging range) is limited to a direction in which the lens barrel 6 is directed as shown in FIG. 1. Therefore, when an image of a desired subject is picked up, the image pickup device mounting position restricted, and this is inconvenient. Further, for example, when an image is taken outdoors by using a portable personal computer, a user must carry not only the portable personal computer, but also a cable and a CCD camera 5, and thus it has a problem in portability.

SUMMARY OF THE INVENTION

Therefore, the present invention has an object to provide a portable personal computer which has high portability and operability, and can ensure an image pickup range without needing a mount space for the image pickup device.

In order to attain the above object, according to the present invention, a portable personal computer having a display unit for displaying graphics, characters, etc. on a screen and an operation unit for inputting information, includes an upper panel having the display unit, a lower panel having the operation unit, an electronic camera which is at least partially designed in a spherical shape, and a mount recess portion having a curved-face support portion which is secured to a part of the upper panel and brought into contact with the spherical surface of the electronic camera to rotatably hold the electronic camera.

Further, the electronic camera which is detachably mounted on the mount recess portion secured to the portable personal computer comprises a lens, an image pickup element, a cubic housing in which the lens and the image pickup element are accommodated and which is brought into contact with the curved-face support portion provided to the mount recess portion of the personal computer so as to be rotatable, and a connector for outputting image data obtained from the image pickup element through a cable.

DETAILED DESCRIPTION OF THE PREFERRED EMBODIMENTS

Preferred embodiments in which the present invention is applied to a portable personal computer or PDA (personal digital assist) having an image pickup device will be described hereunder with reference to the accompanying drawings.

First, a portable personal computer 10 according to a first embodiment of the present invention will be described with reference to the accompanying drawings.

Figure 2:
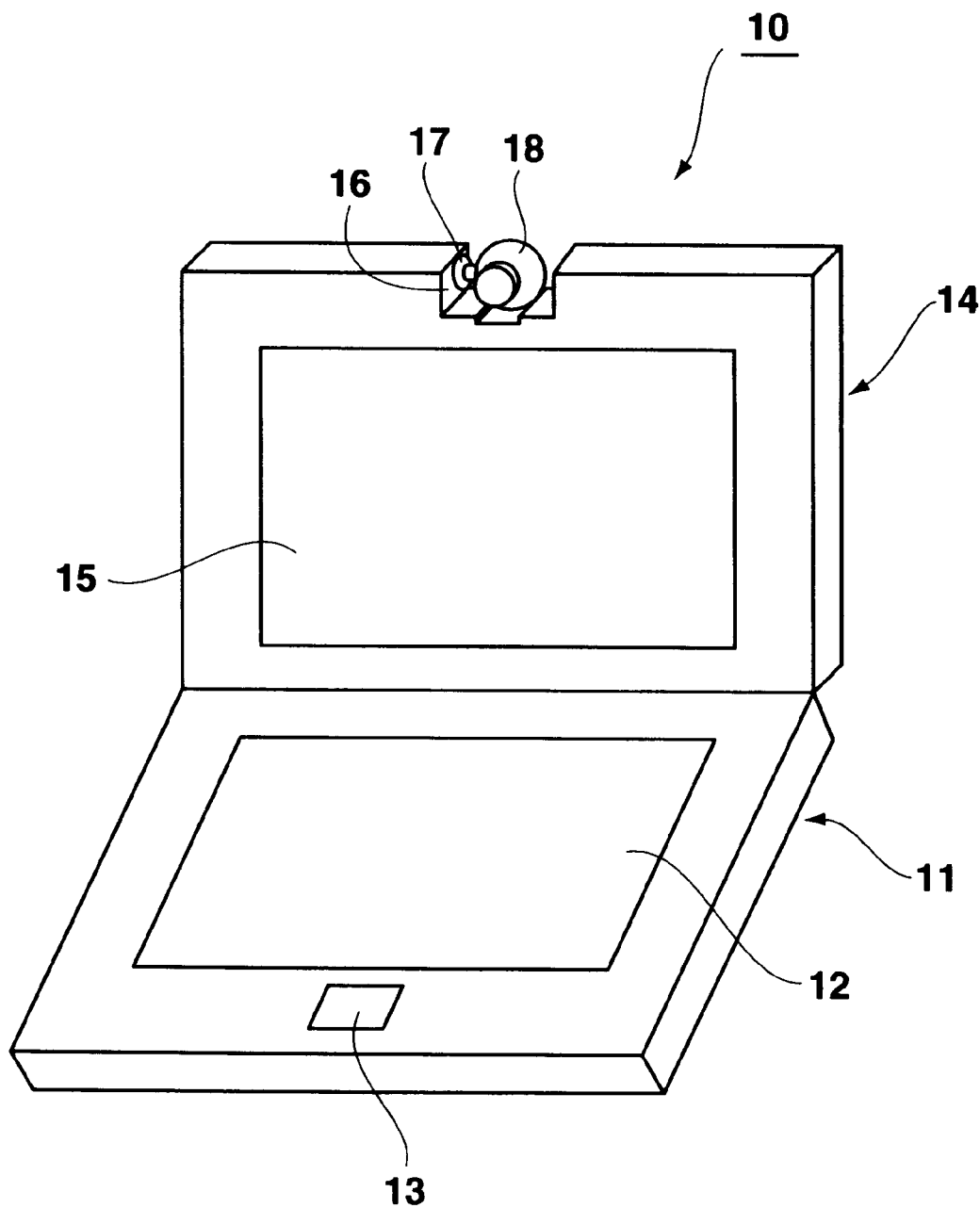
FIG. 2 is an overall perspective view showing a portable personal computer having the CCD camera according to the first embodiment.

As shown in FIG. 2, the portable personal computer 10 is constructed by a main body 11 comprising a housing which is designed to have a rectangular thin body, and a display panel portion 14 which comprises a housing having the same size as the main body 11 and is mounted to the main body 11 so as to be opened and closed and serves to display graphics, characters, etc. When the portable personal computer 10 is used, the display panel portion 14 is upwardly rotated and opened, and when it is not used, the display panel portion 14 is downwardly rotated and closed.

The main body 11 is provided with a keyboard 12 and a track pad 13 which are operated by an user. The input/output operation of data is performed by operating the keyboard 12 and the track pad 13. In the main body 11 is installed a circuit board in which a CPU (Central Processing Unit), a ROM (Read Only Memory) and a RAM (Random Access Memory) are mounted (these elements are not shown in the figures).

The display panel portion 14 is provided with a liquid crystal display 15 for displaying graphics, characters, etc., and a mount groove 16 in which a CCD camera 18 as described later is freely slidably and rotatably mounted is formed at the central portion of the upper side of the liquid crystal display 15. The mount groove 16 is formed by cutting out a part of the central portion of the upper side of the display panel portion 14 in a substantially U-shape. The CCD camera 18 is supported by a support member 17 which is provided in the mount groove 16.

The support member 17 has a cup-shaped (semi-spherical) support curved-surface 17b which is the same shape as the curved-surface of a rotational ball 25 of the CCD camera 18. The support member 17 has at least two support curved-surfaces which corresponding to the curved surface of the rotational ball 25, and the rotational ball 25 (the CCD camera 18) is freely slidably supported while sandwiched by the two support curved-surfaces 17b. The number of the support curved-surfaces 17b is not limited to the above embodiment.

Figure 3:
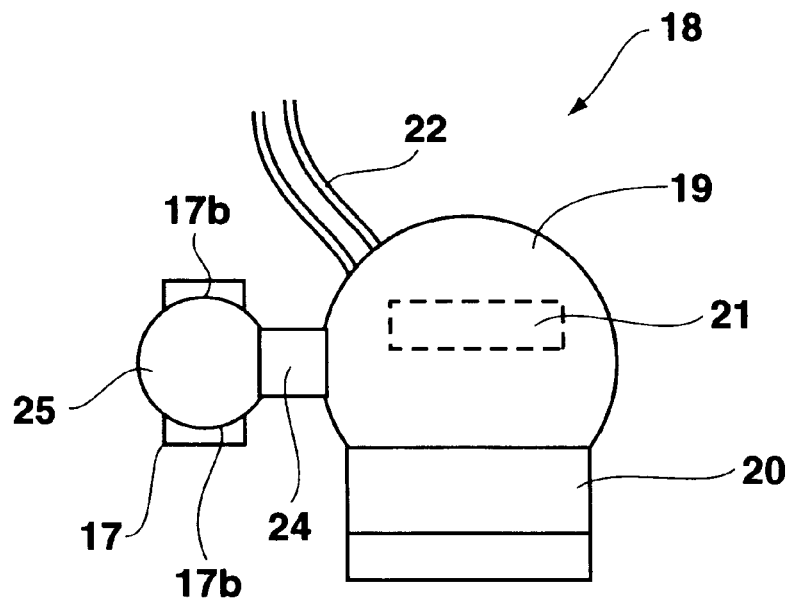
FIG. 3 is a schematic plan view showing the CCD camera.
Figure 4:
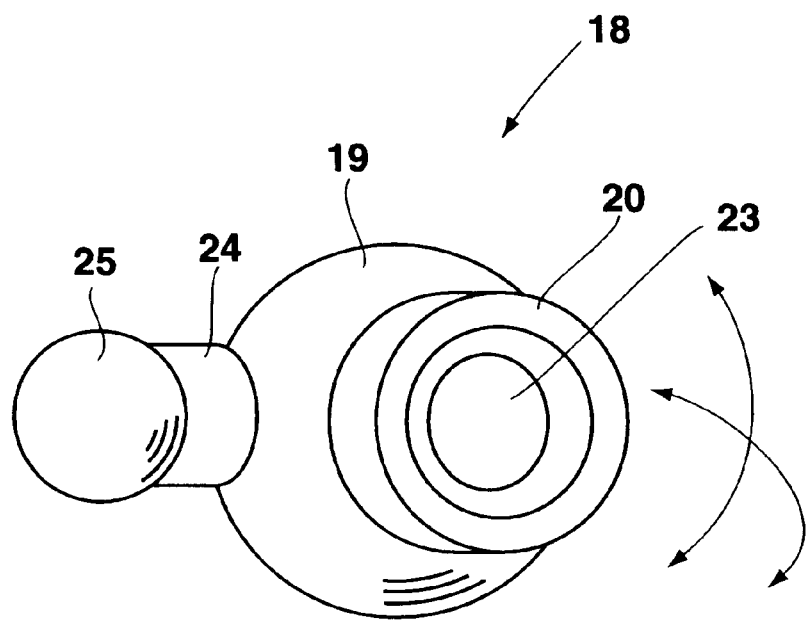
FIG. 4 is an overall perspective view showing the CCD camera.

The CCD camera 18 comprises a camera main body 19 which is designed in a substantially spherical shape as shown in FIGS. 3 and 4, a lens portion 20 which is formed so as to project from the camera main body 19, a rotational shaft 24 which is linked to a part of the camera main body 19, and the rotational ball 25 which is linked to the other end side of the rotational shaft 24. The camera main body 19 is provided with a cable 22 which is linked to a circuit board (not shown) in a personal computer 10. The cable 22 may be designed to extend through the inside of the rotational shaft 24 and the rotational ball 25 and connect to the circuit board in a personal computer 10.

A CCD 21, a circuit board, etc. (not shown) are provided in the substantially spherical camera main body 19. By sliding the camera main body 19, the CCD 21 can pick up an image of a desired area through the lens 20, and the pick-up image data are taken in the personal computer 10 through the cable 22, and then processed to perform various applications.

The lens portion 20 is designed in a cylindrical shape and formed integrally with the camera main body 19. As shown in FIG. 4, the lens portion 20 is provided with a lens 23, and a pickup image is focused on the CCD 21 through the lens 23.

The rotational shaft 24 is linked and fixed to the camera main body 19 at one end thereof, and the rotational ball 25 is linked to the other end of the rotational shaft 24. The rotational ball 25 is designed to be smaller than the camera main body 19 in diameter. As described above, the rotational ball 25 is freely slidably supported by the support member 17 which is provided to a part of the housing of the personal computer 10.

As described above, the camera main body 19 is provided with the rotational ball 24 which has a predetermined length. Therefore, if an external force is applied to the camera main body 19 to vary its facing direction, the rotational force is transmitted from the rotational shaft 24 to the rotational ball 25. That is, the camera main body 19 is turned around the rotational ball 25, and the image pickup area can be suitably varied. When no rotational force is applied, the rotational ball 25 is not rotated in the support member 17 and fixedly keeps the image pickup direction of the camera main body 19.

Accordingly, although the rotational ball 25 is smaller than the camera main body 19 in diameter as described above, the rotational ball 25 can be stably and surely fixed to the camera main body 19 by designing the support curved-surfaces of the support member 17 to have the same shape as the curved-surface of the rotational ball 25 increasing the contact area between the support member 17 and the rotational ball 25 and thus increasing the frictional coefficient.

Accordingly, only when a rotational force which is strong enough to turn the camera main body is applied to the camera main body 19, the rotational ball 25 is rotatable in the support member 17. On the other hand, when no force is applied, the rotational ball 25 keeps the attitude of the camera main body 19 without being rotated due to the dead weight of the camera main body 19. As described above, the camera main body 19 can be freely turned within a predetermined angle range to set its face in a desired direction.

The cable 22 is led from the camera main body 19 as shown in FIG. 3, and connected to the circuit board in the personal computer 10 as shown in FIG. 2. An image which is focused on the CCD 21 an be taken in the personal computer 10 through the cable 22.

Next, a method for using the portable personal computer 10 according to the first embodiment of the present invention described above will be described.

First, when the display panel portion 14 is upwardly opened to take an image into the personal computer 10, an operator determines an image pickup direction of the camera main body 19 of the CCD camera 18 to set an image pickup range. The image pickup direction of the camera main body 19 can be varied in four directions of upward, downward, leftward and rightward directions, so that the operator can pick up not only an image of a front side, that is, the operator of the personal computer 10, but also peripheral images.

By operating the keyboard 12 or the track pad 13, a desired image is picked up by the CCD 21, and it is input as image data into the personal computer 10. If necessary, the image data may be stored in a storage medium such as a hard disc or the like which is installed in the personal computer 10, or printed by a printer (not shown).

Further, if the personal computer 10 is connected to a communication line, the image could be transmitted to a personal computer of a communication target. At the reception side, the image can be displayed on a display monitor in real time, and thus it can be practically used for a television meeting or conference system.

As described above, the CCD camera 18 is integrally installed in the display panel 14, so that it is unnecessary to find the mount position of the CCD camera 18 in or around the personal computer 10, and also it is unnecessary to consider an external wiring through which the CCD camera 18 and the personal computer 10 are connected to each other. Accordingly, the portability and general versatility can be enhanced, and also it needs no labor and no space to mount the CCD.

Next, a portable personal computer 10A according to a second embodiment of the present invention will be described.

Figure 1:
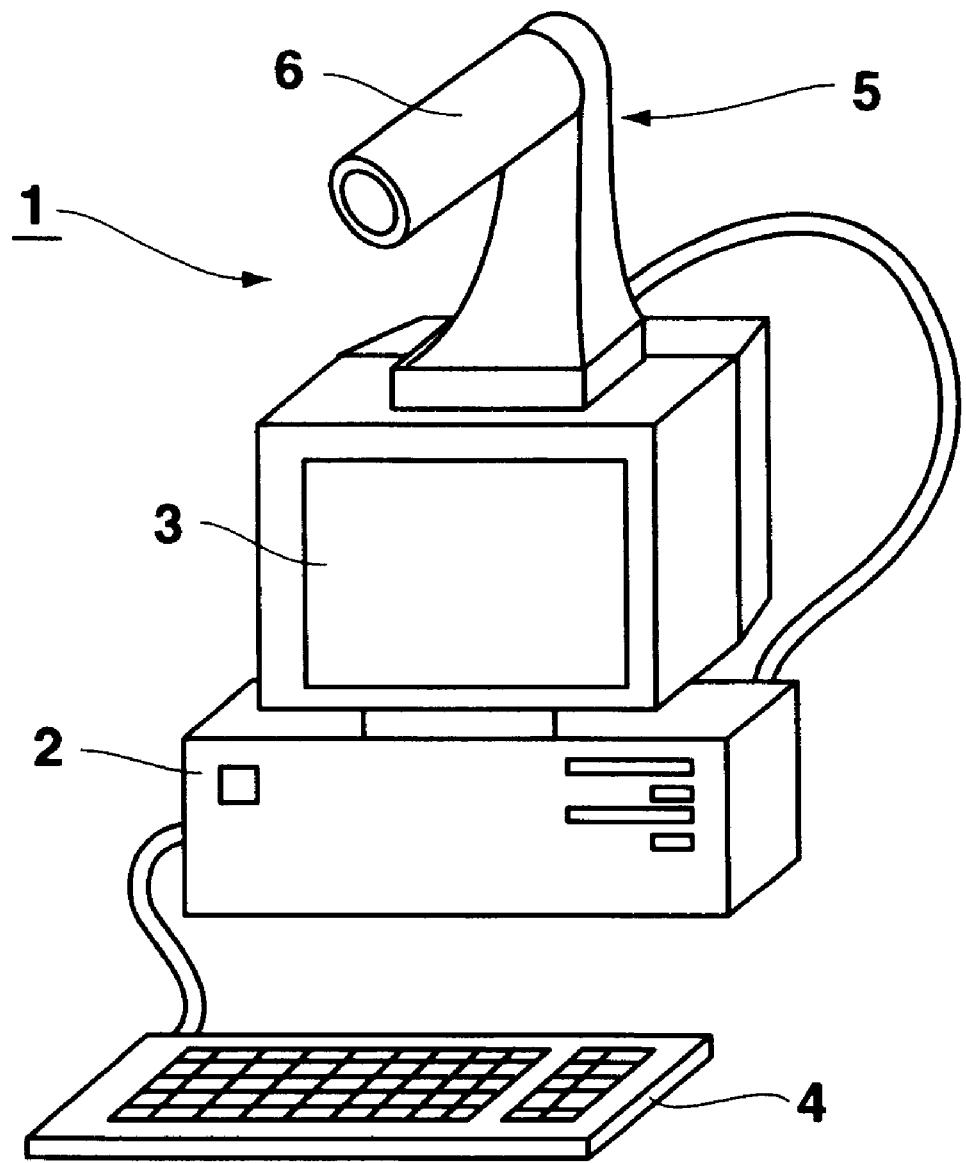
FIG. 1 is a diagram showing a CCD camera which is used while connected to a conventional personal computer.
Figure 5:
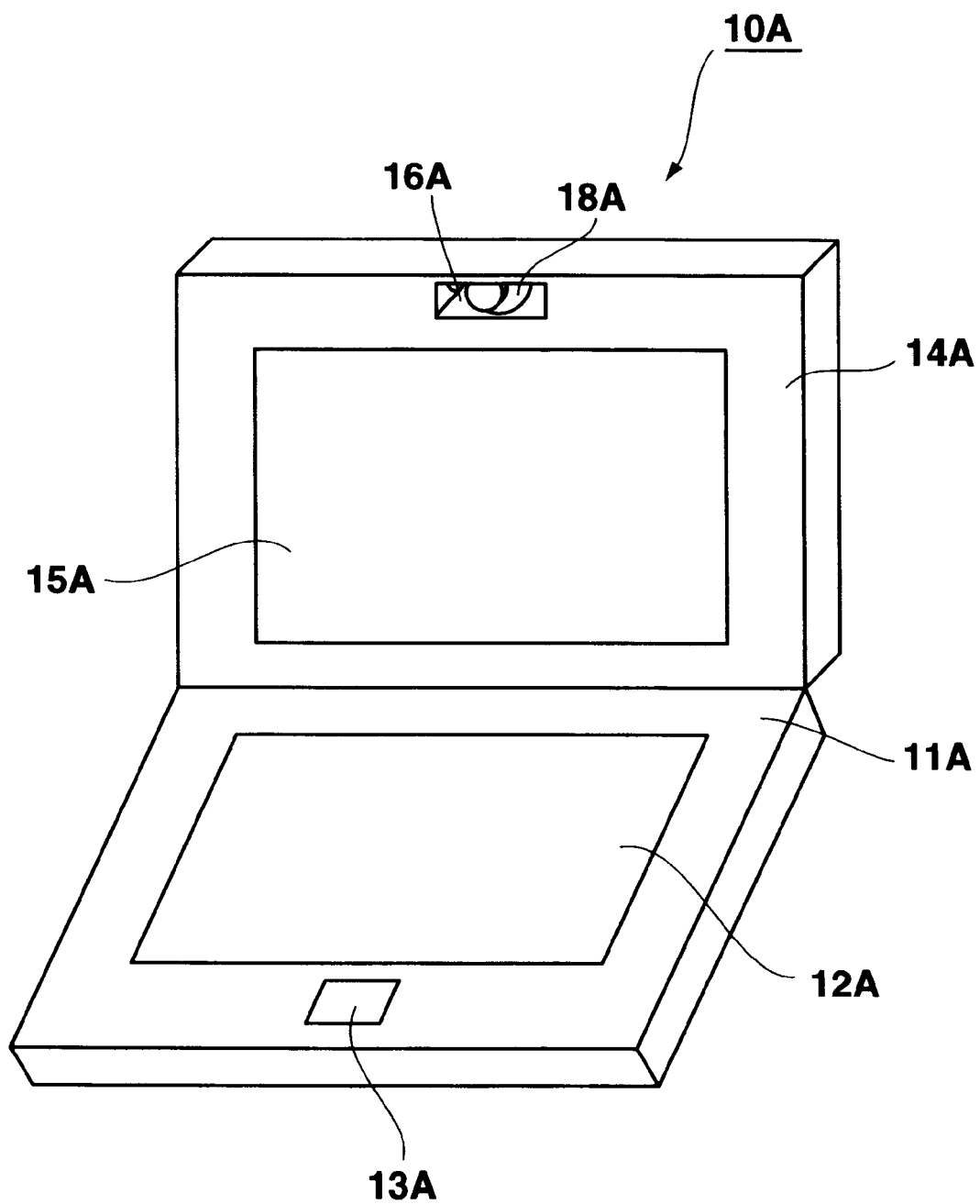
FIG. 5 is a schematic overall perspective view showing a portable personal computer having a CCD camera according to a second embodiment of the present invention.

As in the case of the portable personal computer 10 of the first embodiment (see FIG. 1), the portable personal computer 10A of the second embodiment includes a main body 11A, and a display panel 14A as shown in FIG. 5. A substantially rectangular mount groove 16A in which a CCD camera 18A is accommodated is provided at the central position of the upper side of the housing of the display panel 14A.

The main body 10A of the portable personal computer is provided with a keyboard 12A for performing an input operation and a track pad 13A, and desired data are input/output by operating the keyboard 12A or the track pad 13A. Further, the display panel 14A is provided with a liquid crystal display 15A for displaying graphics, characters, etc., and a mount groove 16A is formed at the central portion of the upper side of the liquid crystal display 15A.

Figure 6:
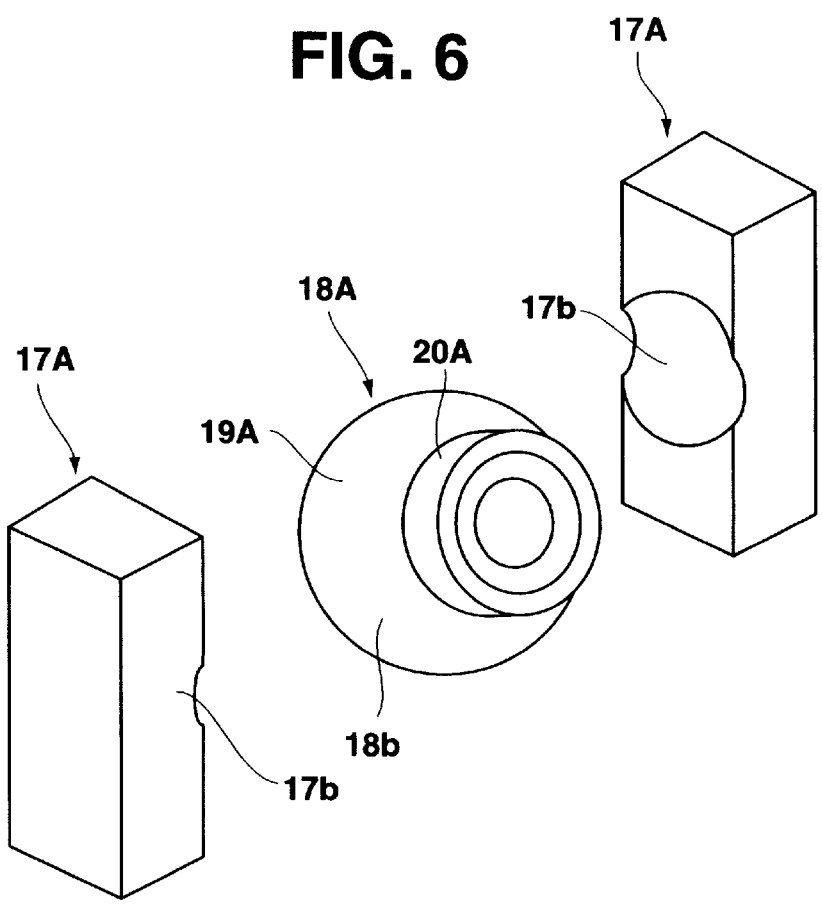
FIG. 6 is a schematic perspective view showing a mount structure of the CCD camera.

As shown in FIG. 6, the mount groove 16A is provided with support members 17A, each support member 17A being designed to have at one side surface thereof a support curved-surface 17b having the same concave shape as the spherical surface 18b of the CCD camera 18A, and the CCD camera 18A is sandwiched between the support members 17A through the support curved-surfaces 17b. That is, the CCD camera 18A is supported by the support members 17A in the mount groove 16A.

Figure 7:
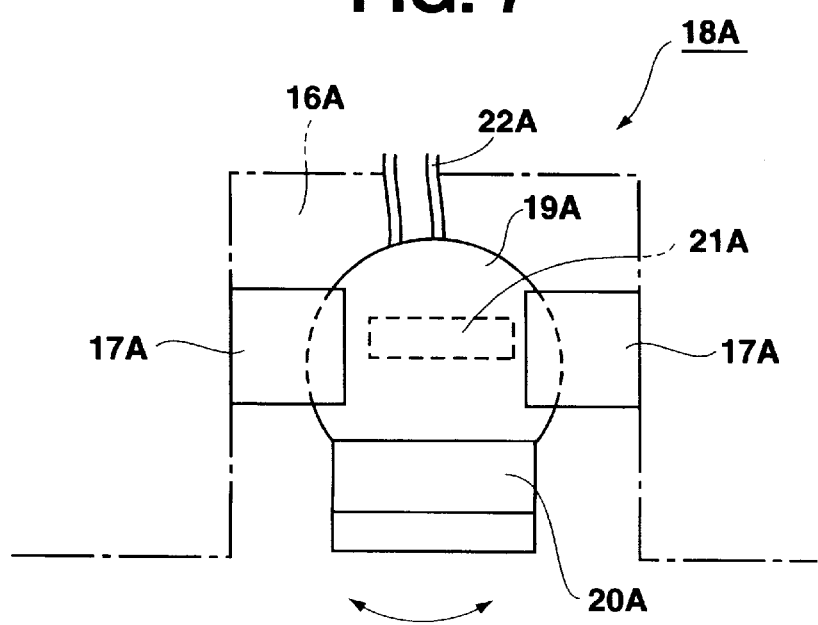
FIG. 7 is a schematic plan view showing the mount structure of the CCD camera.
Figure 8:
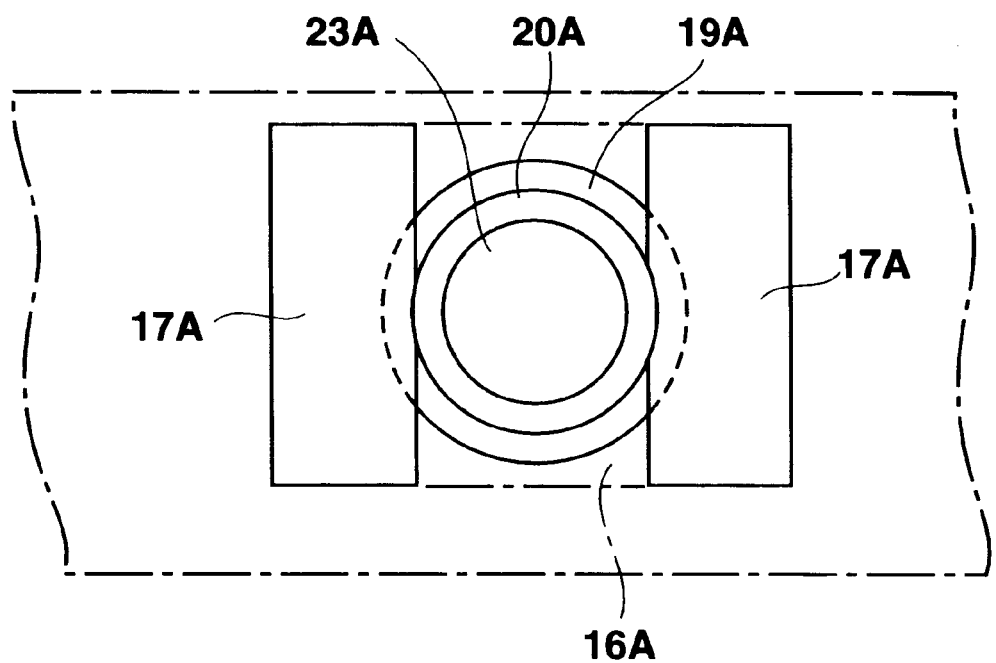
FIG. 8 is a schematic front view showing the mount structure of the CCD camera.

The CCD camera 18A comprises a camera main body 19A, and a lens portion 20A as shown in FIGS. 7 and 8. The camera main body 19A is provided with a cable 22A to be connected to the personal computer. The camera main body 19A is formed in a substantially spherical shape, and it is formed integrally with the lens portion 20A. A CCD (Charge-Coupled Device) 21A, an electric circuit (not shown), etc. are provided in the camera main body 19A. An image which is picked up by the CCD 21A is input as image data (not show) into the personal computer 10A through the cable 22A.

The lens portion 20A is designed in a cylindrical shape and formed integrally with the cable 22A. As shown in FIG. 8, the lens portion 20A is provided with a lens 23A, and an image is focused on the CCD 21A through the lens 23A.

As shown in FIGS. 6, 7 and 8, each support members 17A has the support curved-surface (concave surface) 17b which is conformable to the spherical shape 18b of both the side surfaces of the camera main body 19A, and the camera main body 19A is freely slidably supported by the support members 17A through the support curved-surfaces 17b thereof. The CCD camera 18A may be designed to be detachable from the personal computer 10A. The support members 17A may be disposed at both the upper and lower sides of the CCD camera 18A in place of at both the right and left sides of the CCD camera 18A. Further, the support members 17A may be disposed so that the CCD camera 18A is pinched from the four (i.e., upward, downward, rightward and leftward) directions by the support members 17A.

Next, a portable personal computer 10B according to a third embodiment of the present invention will be described.

Figure 9:
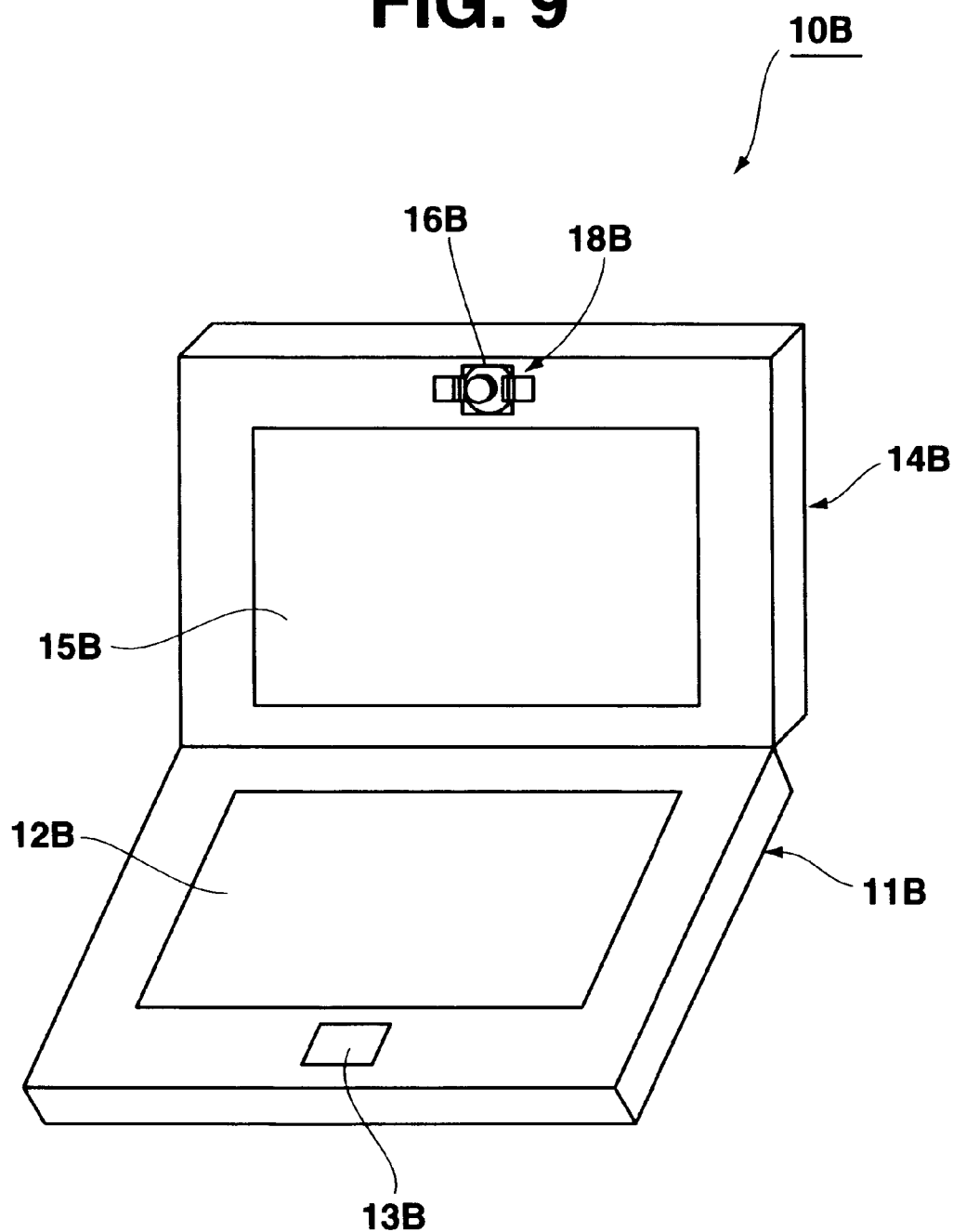
FIG. 9 is a schematic overall perspective view showing a portable personal computer having a CCD camera according to a third embodiment.
Figure 10:
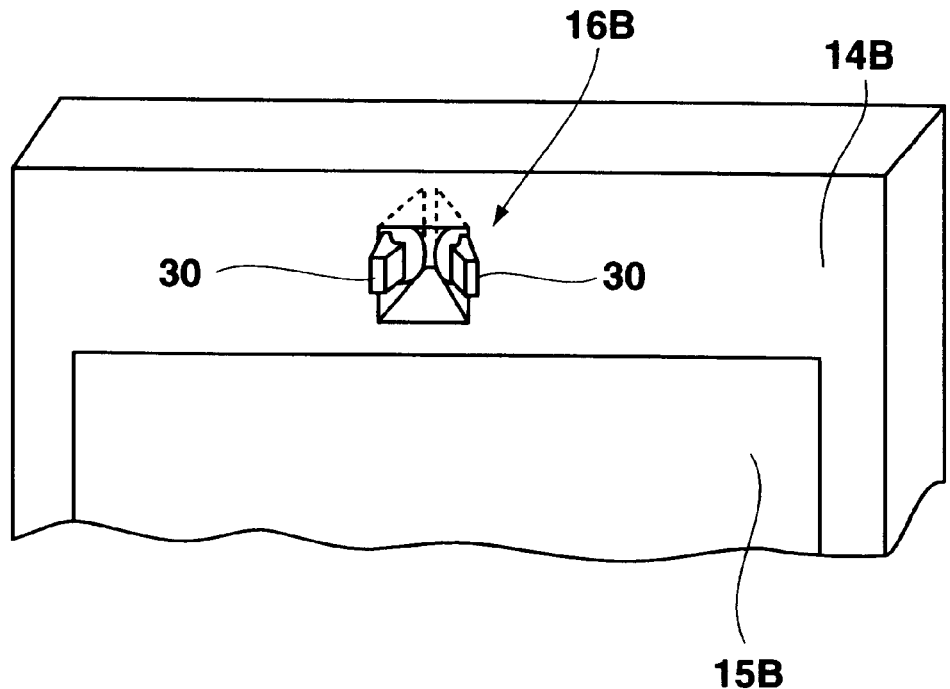
FIG. 10 is a schematic perspective view showing the main part of the mount structure of the CCD camera which is provided to a part of the portable personal computer.

The portable personal computer 10B is designed so that a CCD camera 18B is easily detachable therefrom. Like the first and second embodiments, the portable personal computer 10B comprises a thin-type rectangular main body 11B, and a display panel 14B which is secured to the main body 11B so as to be freely opened and closed and serves to display graphics, characters, etc. as shown in FIG. 9. As shown in FIG. 10, an opening 16B in which the CCD camera 18B is detachably mounted is provided at the central portion of the upper side of the housing constituting the display panel 14B. The opening portion 16B is designed as a V-shaped mount groove which is gradually narrowed in the depth direction.

Like the first and second embodiments, the main body 11B is provided with a keyboard 12B and a track pad 13B, and desired data can be input/output by operating the keyboard 12B or the track pad 13B.

Like the first and second embodiments, the display panel 14B is provided with a liquid crystal display 15B for displaying graphics, characters, etc. The liquid crystal display 15B is provided with an opening 16B at the central portion of the upper side thereof.

Figure 11:
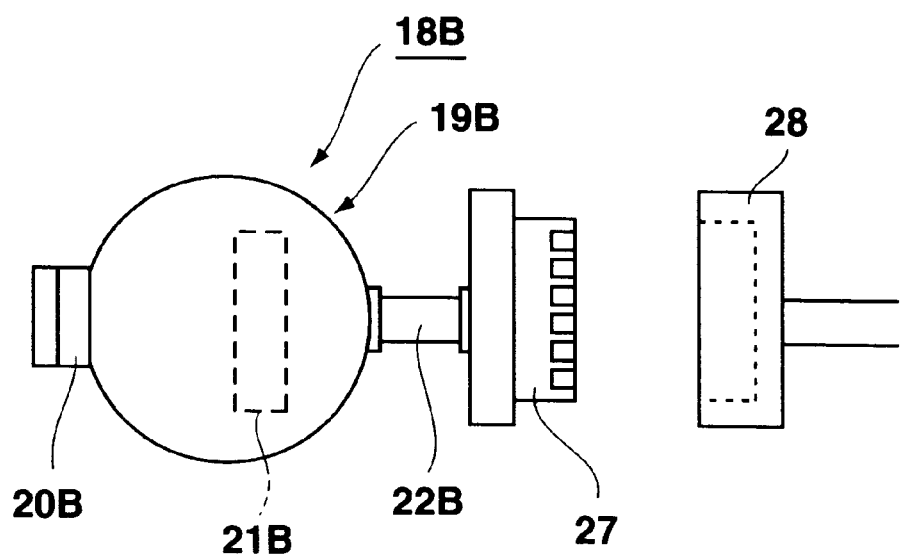
FIG. 11 is a schematic plan view showing the CCD camera.

The CCD camera 18B which is detachably mounted in the mount groove comprises a camera main body 19B, a lens portion 20B, a cable 22B and a connector 27 as shown in FIG. 11.

Figure 12:
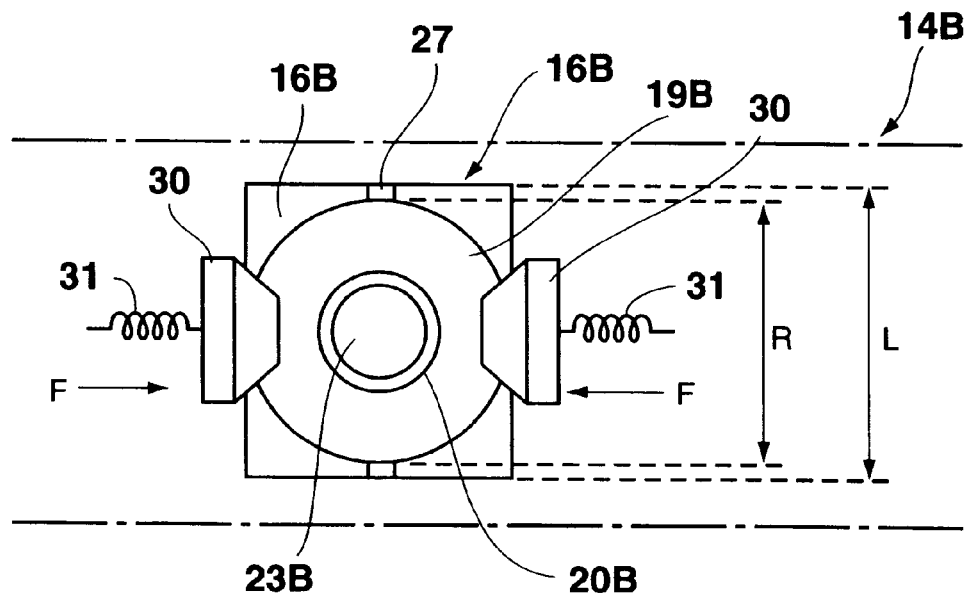
FIG. 12 is a diagram showing the mount state of the CCD in a mount groove provided to a part of the housing of the portable personal computer, which is viewed from the front side.

The camera main body 19B is formed in a spherical shape, and it is formed integrally with the lens portion 20B. A CCD (Charge-Coupled Device) 21B, an electric circuit (not shown), etc. are provided in the camera main body 19B. An image which is picked up by the CCD 21B is input to the personal computer 10A through the cable 22B and the connector 27. The lens portion 20B is designed in a cylindrical shape, and formed integrally with the camera main body 19B. As shown in FIG. 12, the lens portion 20B is provided with a lens 23B, and an image is focused on the CCD 21B through the lens 23B.

The cable 22B is secured to the camera main body 19B, and the connector 27 is provided to the tip of the cable 22B. The connector 27 is connected to a connector 28 of the mount groove 16B when the CCD camera 18B is mounted in the mount groove, thereby electrically connecting the CCD camera 18B and the personal computer.

Figure 13:
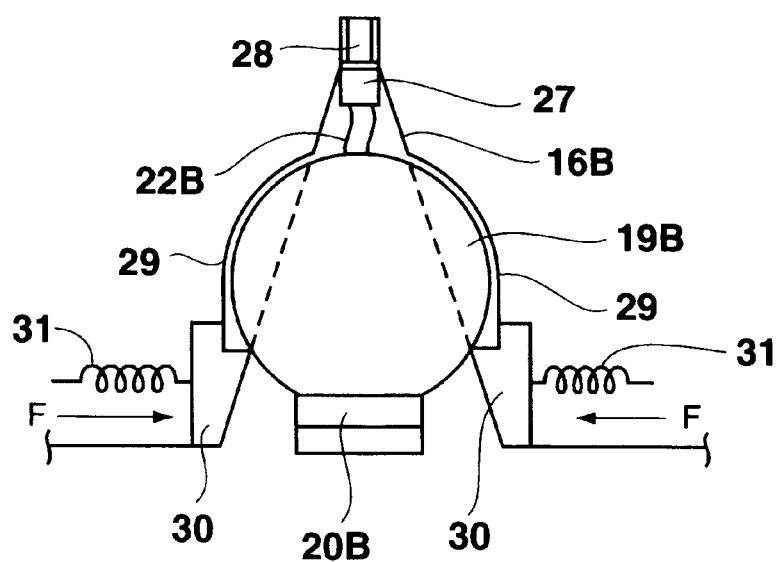
FIG. 13 is a diagram showing a plan view of the mount state in which the CCD camera is mounted to a part of the housing of the portable personal computer.

As shown in FIGS. 12 and 13, the size of the opening 16B is set so that the CCD camera 18B is detachably mounted in the opening 16B. Support curved-surfaces 29 each of which is designed to be conformable to the shape of the curved surface as the spherical camera main body 19B are formed on the side surfaces of the V-shaped groove of the opening 16B. The connector 28 which is connected to the connector 27 of the CCD camera 18B is provided at the deepest position of the V-shaped groove. Further, a pair of stoppers 30 for holding the spherical camera main body 19B in the groove are provided in the vicinity of the inlet of the mount groove as shown in FIGS. 12 and 13.

These stoppers 30 are urged toward the inside of the mount groove (in the direction of arrow F) by springs 31. That is, when the CCD camera 18B is mounted in the mount groove, the stoppers 30 are opened outwardly (in the counter direction of the arrow F), and after the CCD camera 18B is inserted into the mount groove, the CCD camera 18B is held in the mount groove. The electrical connection is established by connecting the connector 27 of the CCD camera 18B to the connector 28 in the mount groove. The spherical surface of the CCD camera 18B is supported by the support curved-surfaces 29, whereby the image pickup range can be freely changed.

Figure 14A:
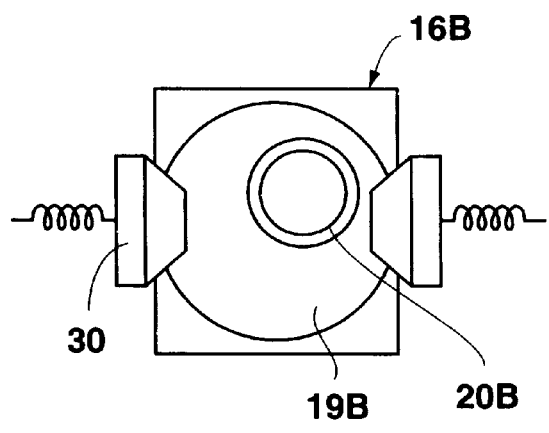
FIGS. 14A/B are the diagrams showing a state where the image pickup element is freely slidable (rotatable) in the mount groove which is provided to a part of the housing of the electronic equipment.
Figure 14B:
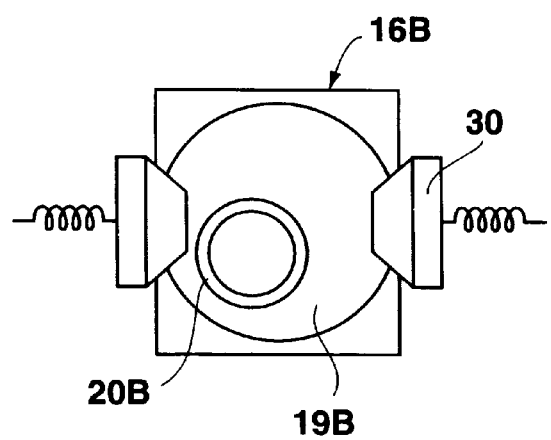

When the mount groove thus constructed is viewed from the front side of the panel 14B, the length L in the longitudinal direction is set to be slightly longer than the diameter R of the camera main body 19B as shown in FIG. 13, so that the camera main body 19B is freely slidable and rotatable in the mount groove. Accordingly, as shown in FIG. 14, the image pickup range can be freely changed with a predetermined angle range.

In the first, second and third embodiments, the CCD camera 18, 18A, 18B serving as an image pickup equipment is mounted at the central portion of the upper side of the liquid crystal display 15, 15A, 15B. However, it may be mounted at any position of the portable personal computer 11, 11A, 11B insofar as an image of a desired range containing an operator can be picked up.

The present invention is not limited to the first, second and third embodiments insofar as the structure is designed so that the image pickup direction of the CCD is freely changeable by using the spherical shape of the CCD while the CCD is embedded in a part of the housing of the personal computer.

As described above, according to the portable personal computer of the present invention, the CCD camera is embedded in the housing so that the image pickup range thereof is freely changeable. Accordingly, it needs no labor and space to mount the CCD camera in the portable personal computer. In addition, the image pickup range directing to the operator can be easily changed, and the portability and the general versatility can be enhanced.

Further, the contact between the spherical surface of the CCD and the curved surface of the support member is utilized to freely rotate the CCD camera portion, so that the contact area between the CCD and the support member is broadened even when the CCD is embedded in a narrow area of the housing, so hat the image pickup direction can be set stably and surely.

What is claimed is:

1. A portable personal computer having a display for displaying graphics and characters on a screen, and an operation unit for inputting information, the personal computer comprising:

an upper panel provided with said display;

a lower panel provided with said operation unit;

an electronic camera having an extension member including a spherically shaped portion; and a mount recess portion formed in said upper panel having an elastic curved-surface support portion adapted for mating with said spherically shaped portion of said extension member forming a ball-and-socket joint and for slidably, rotatably in every direction and detachably holding said spherically shaped portion of said electronic camera.

2. The portable personal computer as claimed in claim 1, wherein said electronic camera comprises:

a lens;

an image pickup device; and a cable for routing image data obtained by said image pickup device.

3. The portable personal computer as claimed in claim 2, wherein said electronic camera further comprises a first connector provided at one end of said cable, and wherein said first connector is connected to a second connector provided in said mount recess portion, whereby said electronic camera is detachably mounted in said mount recess portion.

4. The portable personal computer as claimed in claim 3, wherein said mount recess portion further includes a stopper for elastically holding said electronic camera in combination with said curved-surface support portion.

5. The electronic camera as claimed in claim 2, wherein said image pickup device is a charge coupled device.

6. A portable personal computer having a display and a keyboard, the portable personal computer comprising:

an upper panel provided with said display having a mount recess portion formed thereon, wherein said mount recess portion includes an elastic curved-surface support portion; and a miniaturized camera including a substantially spherical camera main body and a photodetector, wherein said spherical camera main body forms a ball-and-socket joint with said elastic curved-surface support portion and is slidably, rotatably in every direction and detachably supported by said elastic curved-surface support portion in said mount recess portion.

* * * * *